United States Patent [19]

Rozman

[11] Patent Number: 5,194,801
[45] Date of Patent: Mar. 16, 1993

[54] POWER GENERATION SYSTEM WITH TRANSIENT SUPPRESSOR

[76] Inventor: Gregory L. Rozman, 1112 Nassau Pkwy., Rockford, Ill. 61107

[21] Appl. No.: 679,248

[22] Filed: Apr. 2, 1991

[51] Int. Cl.[5] .............................................. H02H 7/06
[52] U.S. Cl. ........................................ 322/28; 322/22
[58] Field of Search ................... 322/22, 23, 24, 25, 322/28, 59, 73; 361/20, 21, 33, 56, 86, 91, 92, 111

[56] References Cited

U.S. PATENT DOCUMENTS

| | | | |
|---|---|---|---|
| 3,818,317 | 6/1974 | Isono et al. | 322/21 |
| 4,225,911 | 9/1980 | Carlson | 363/50 |
| 4,439,722 | 3/1984 | Budnik | 323/248 |
| 4,459,631 | 7/1984 | McNamee | 322/28 X |
| 4,584,515 | 4/1986 | Edwards | 322/28 |
| 4,679,112 | 7/1987 | Craig | 322/28 X |
| 5,023,539 | 6/1991 | Miller et al. | 322/28 |
| 5,055,765 | 10/1991 | Rozman et al. | 322/22 |

Primary Examiner—Steven L. Stephan
Assistant Examiner—Kristine Peckman
Attorney, Agent, or Firm—Marshall, O'Toole, Gerstein, Murray & Bicknell

[57] ABSTRACT

Prior power generation systems generated output voltages having relatively large, undesirable overvoltage transients due sudden load reduction. In order to overcome this disadvantage, a power generation system for generating a DC bus voltage on a DC bus is provided with a switch coupled across the DC bus to suppress overvoltage transients. The power generation system includes a synchronous generator that generates AC power and a rectifier that rectifies the AC power to produce DC power and supply the DC power to the DC bus. A voltage regulator controls magnitude of the DC bus voltage by varying the amount of current provided to a field winding associated with the synchronous generator. A switch is coupled across the DC bus and is repeatedly switched when the DC bus voltage reaches a predetermined magnitude. When the switch is in operation, the voltage regulator controls the DC bus voltage based upon an emulated voltage generated by a voltage emulator.

31 Claims, 5 Drawing Sheets

POWER GENERATION SYSTEM WITH TRANSIENT SUPPRESSOR

TECHNICAL FIELD

The present invention relates to a power generation system, such as one used for an aircraft, that generates and supplies DC power to a DC link, with the voltage of the DC power being limited to a maximum magnitude to suppress overvoltage transients caused by sudden load removal.

BACKGROUND

Power generation systems, such as those used in aircraft, are conventionally used to generate electrical power from the aircraft engines to provide both DC and AC electrical power for numerous components of the aircraft such as lights, controls, cockpit instruments, etc. via a DC link and an AC link, respectively.

During operation of the aircraft, the electrical power supplied by the power system may exhibit overvoltage transients if the load is suddenly removed. These overvoltage transients may occur in the DC power supplied on the DC link and/or in the AC power supplied on the AC link. These overvoltage transients are undesirable, and may cause damage to the aircraft components connected to the respective DC or AC link.

Various attempts have been made to reduce or eliminate the harmful effects of such overvoltage transients. For example, U.S. Pat. No. 4,225,911 to Carlson discloses an electrical power system for an aircraft having means for reducing overvoltage transients in the AC power generated by the system. The Carlson system operates by sensing the magnitude of the current generated by the system in each of the three AC power lines, and then altering the magnitude of a feedback control signal based thereon to control the magnitude of the AC power generated.

U.S. Pat. No. 4,439,722 to Budnik discloses a stabilization circuit for use with a power supply to maintain a steady DC output voltage during power line transients, rapid load changes, or no-load conditions. The Budnik stabilization circuit is responsive to the output voltage of the power supply and selectively connects a load across the output terminals of the power supply. Although it may act to suppress overvoltage transients in the DC power provided, the Budnik circuit provides only relatively short term control of the output voltage.

SUMMARY OF THE INVENTION

The invention is directed to a power generation system with a transient suppressor to suppress overvoltage transients caused by sudden load removal. The power generation system includes a prime mover, a synchronous generator coupled to the prime mover to generate AC power, and a rectifier coupled to the synchronous generator to generate DC power having a DC voltage at the output of the system.

The voltage produced by the power generation system is controlled by a voltage regulator based upon the magnitude of a feedback signal. The feedback signal may be based upon the magnitude of the DC voltage during a first time period and a second control voltage during a second time period in which overvoltage transients are being suppressed.

Overvoltage transients in the voltage generated by the system are suppressed relatively rapidly by voltage reduction means such as a resistor connected via a switch coupled across the output of the system, for example. The switch is switched at a relatively rapid rate to quickly reduce the voltage generated by the system to suppress overvoltage transients.

During operation of the system, the feedback signal provided to the voltage regulator may be based on the voltage generated by the system when the voltage reduction means is not activated and the second control voltage when the voltage reduction means is activated. Due to the combination of voltage reduction means and the use of alternative feedback signals provided to the voltage regulator, overvoltage transients are suppressed by the power generation system, and the control of the system voltage by the voltage regulator is not disturbed by the suppression of the overvoltage transients.

The feedback signal provided to the voltage regulator during the time period in which transients are being suppressed may be a voltage that emulates the voltage that would have been generated by the system if the voltage reduction means had not been activated. In this case, the activation of the voltage reduction means would not substantially affect the control of the DC system voltage by the voltage regulator.

These and other features and advantages of the present invention will be apparent to those of ordinary skill in the art in view of the detailed description of the preferred embodiments, which is made with reference to the drawings, a brief description of which is provided below.

DETAILED DESCRIPTION OF THE PREFERRED EMBODIMENTS

Figure 1:
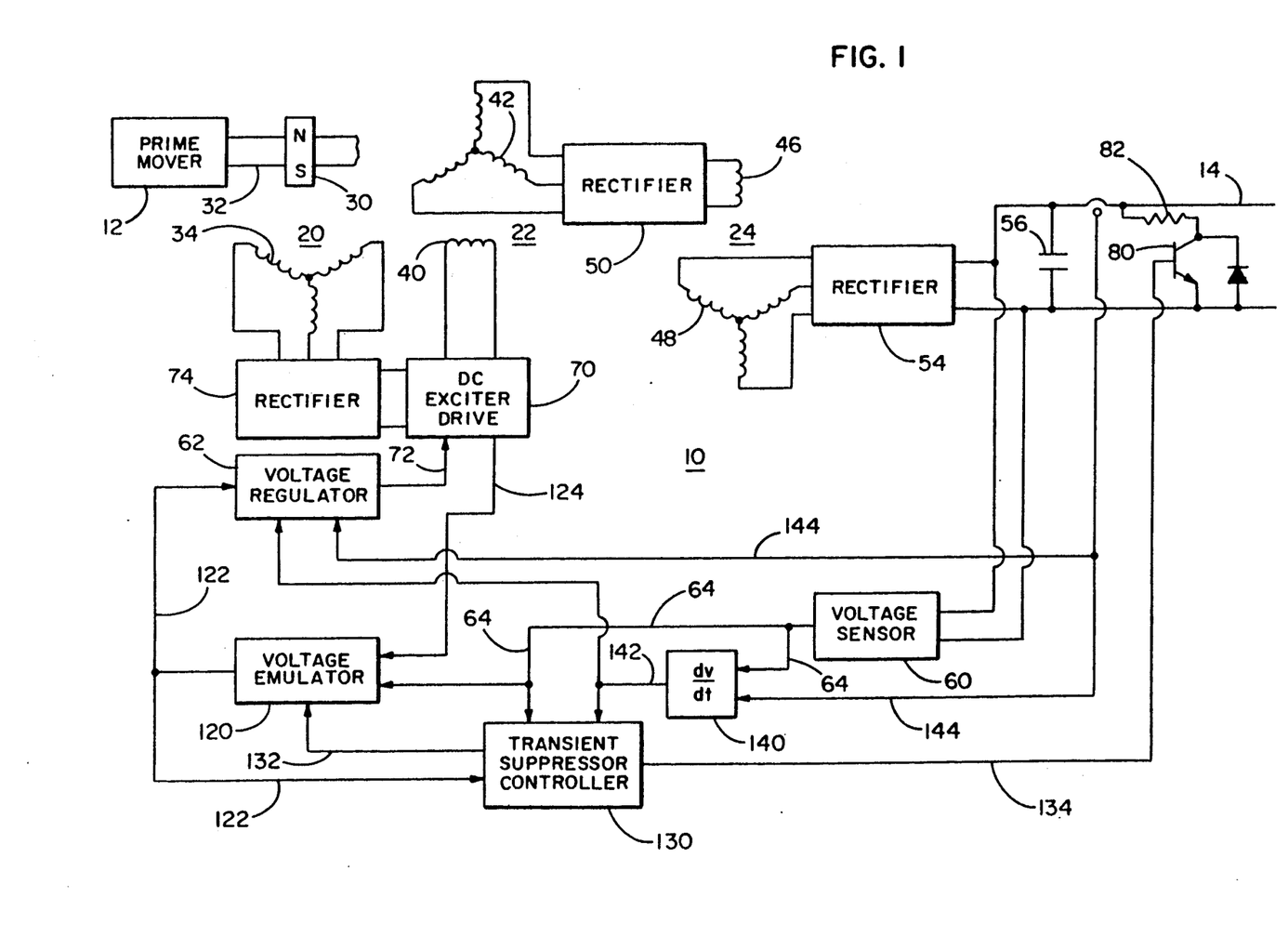
FIG. 1 is an overall diagram of an electrical power generation system in accordance with a preferred embodiment of the invention.

A block diagram of a preferred embodiment of an electrical power generation system 10 in accordance with the invention is shown in FIG. 1. The power generation system 10 converts motive power generated by a prime mover 12, such as jet engine for example, to DC electrical power that is supplied to a DC bus or link 14 to which various aircraft electrical components may be connected. The power generation system 10 may be used in connection with a variable-speed, constant-frequency (VSCF) system, in which case an inverter would be connected to the DC bus 14 to generate AC power from the DC power generated by the system shown in FIG. 1.

The power generation system 10 includes a main generator coupled to the prime mover 12. The main generator includes permanent magnet generator 20, an exciter portion 22, and a synchronous generator 24. The permanent magnet generator 20 includes a permanent magnet 30 coupled to the prime mover 12 via a shaft 32 and a wye-connected armature winding 34 provided adjacent the magnet 30. The exciter portion 22 includes a field winding 40 and a wye-connected armature winding 42 provided adjacent the field winding 40. The armature winding 42 is provided on the shaft 32 so as to rotate with the prime mover 12. The synchronous generator 24 includes a field winding 46 provided on the shaft 32 and a wye-connected armature winding 48. A rotating rectifier 50 is coupled between the output of the armature winding 42 and the field winding 46.

It should be appreciated that the magnet 30, the armature winding 42, the rectifier 50, and the field winding 46 all rotate with the shaft 32 connected to the prime mover 12, while the armature winding 34, the field winding 40, and the armature winding 48 are stationary. During operation of the main generator, the rotation of the field winding 46 induces an AC current in the stationary armature winding 48. This AC current is rectified by a rectifier 54 coupled to the armature winding 48 to generate DC power. A capacitor 56 is coupled across the rectifier 54 to filter out the generator ripple.

A voltage sensor 60 is coupled across the rectifier 54 to sense the magnitude of the DC voltage generated by the rectifier 54. As described in more detail below, a voltage regulator 62 compares the DC voltage measured by the sensor 60 with the desired DC voltage and controls the DC voltage by supplying a control signal to a DC exciter drive circuit 70 via a line 72. The DC exciter drive 70 receives DC power from a rectifier 74 coupled to the armature winding 34 of the permanent magnet generator 20.

During operation, if the DC bus voltage generated by the rectifier 54 is larger than desired, the voltage regulator 62 will cause the DC exciter drive 70 to decrease the amount of excitation current through the field winding 40. This reduction in current will reduce the magnetic field generated by the winding 40, causing a reduction in the current generated in the windings 42 and 46, and ultimately a reduction in the DC bus voltage. Similarly, if the DC bus voltage is too small, the voltage regulator 62 will cause the DC exciter drive 70 to increase the amount of current in the field winding 40, thus increasing the DC bus voltage.

The response time of the voltage regulator 62 is relatively long. As a result, the voltage regulator 62 takes a relatively long period of time to compensate for voltage spikes or transients in the DC bus voltage due to sudden reduced-load or no-load conditions. The response time cannot be significantly shortened since it is determined by the generator main-field time constant.

An important advantage of the present invention is that voltage spikes or transients are quickly reduced without significantly interfering with the ability of the voltage regulator 62 to regulate the DC bus voltage. To this end, a switch comprising a transistor 80 and a resistor 82 is coupled across the output of the rectifier 54. When the DC bus voltage increases to an undesirably large magnitude, the transistor 80 is repeatedly switched on and off at a relatively fast rate to effectively increase the load current and thus reduce the DC bus voltage. As a result, the DC bus voltage is kept below a predetermined maximum magnitude.

Figure 2:
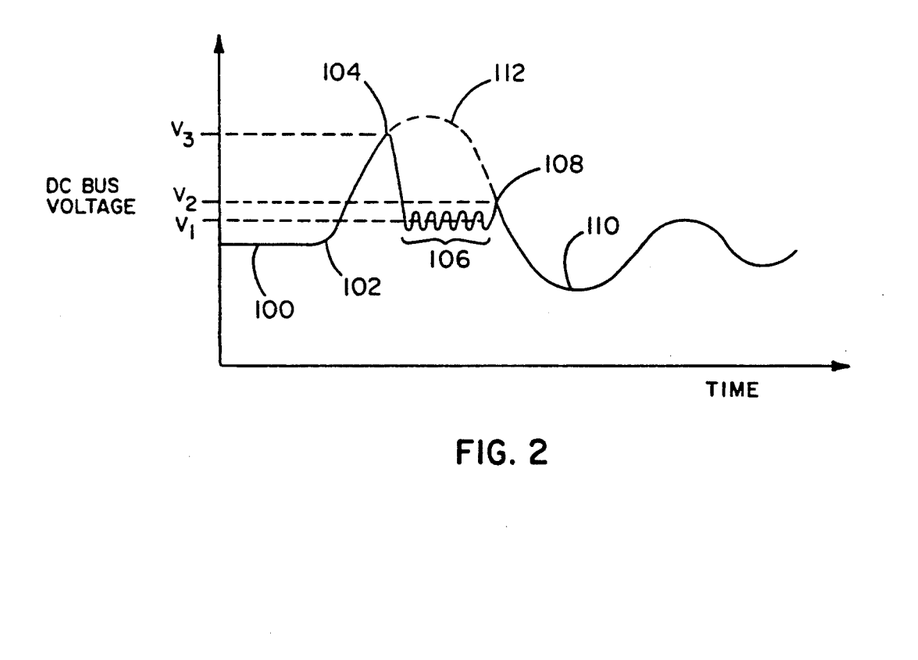
FIG. 2 illustrates two DC voltages generated by the electrical power generation system of FIG. 1.

The time required for the transistor 80 to reduce the DC bus voltage is fast relative to the overall response time of the voltage regulator 62. This is illustrated in FIG. 2, in which the shape of the DC bus voltage generated by the system 10 is shown as a solid line. The solid line has an initial steady portion 100 during which the voltage is relatively constant. At point 102, the voltage begins to rise relatively rapidly as a result of a reduced-load or no-load condition. The voltage peaks at point 104, at which time the transistor 80 is repeatedly switched to lower the voltage to a lower value during portion 106. When the transistor 80 stops switching, the voltage rises again briefly to a peak at point 108, after which the voltage undulates relatively slowly as indicated by the solid-line portion 110. The dotted line 112 in FIG. 2 illustrates what the DC bus voltage would be if the transistor 80 were not repeatedly switched.

As noted above, when the transistor switch 80 is activated, the DC bus voltage as represented by the solid line portion 106 will be lower than it otherwise would have been, as indicated by the dotted line portion 112. Consequently, the manner in which the voltage regulator 62 controls the DC bus voltage would differ, depending on whether the voltage as represented by the solid portion 106 or the dotted portion 112 were fed back to the regulator 62. It can be seen that if the voltage corresponding to the solid portion 106 were fed back to the regulator 62 instead of the dotted portion 112, the regulator 62 would not decrease the excitation current in the field winding 40 as much since the voltage 106 is lower than it otherwise would have been. As a result, the use of the switch 80 alone would interfere with the control of the DC bus voltage performed by the regulator 62 since the voltage would no longer be influenced by only the magnitude of the field current.

This disadvantage is overcome by the present invention with the use of an alternative voltage that is fed back to the regulator 62, instead of the actual DC bus voltage, when the switch 80 is in operation. For example, the alternative feedback voltage may be provided by a voltage emulator that generates a voltage that is substantially identical to the DC bus voltage had the switch 80 not been operated. In this case, the DC bus voltage generated by the voltage emulator would be the voltage shown by the dotted line portion 112. It is this voltage that would be fed back to the voltage regulator 62 when the switch 80 is in operation. As a result, the effects of the switch 80 on the DC bus voltage do not interfere with the control of the voltage as performed by the regulator 62. In essence, the effect of the switch 80 is made invisible to the voltage regulator 62.

Referring back to FIG. 1, a voltage emulator 120 provides either the actual DC bus voltage or an emulated voltage to the voltage regulator 62 via a feedback line 122. As described in more detail below, the voltage emulator 120 generates the emulated voltage based on a voltage provided by the DC exciter drive 70 via a line 124. The voltage emulator 120 is controlled by a transient suppressor controller 130. The controller 130 generates an enable signal on a line 132 which is provided to the voltage emulator 120. As described in more detail below, the enable signal is activated during the suppression mode of the system. This suppression mode begins when the DC bus voltage reaches a predetermined magnitude and ends when the emulated voltage generated by the emulator 120 falls below a predetermined magnitude.

When activated, the enable signal causes the voltage emulator 120 to generate the emulated DC bus voltage and provide the emulated voltage to the voltage regulator 62 during the suppression mode time period. This time period is the time from point 104 to point 108 as indicated in FIG. 2. At all other times, the voltage emulator 120 provides the actual DC bus voltage from the voltage sensor 60 to the voltage regulator 62 via the feedback line 122.

The transient suppressor controller 130 also generates a switching signal on a line 134 that is coupled to the base of the transistor 80 and causes the transistor 80 to be rapidly switched during the suppression mode.

The period of time, or suppression mode time period, that the enable and switching signals on the lines 132, 134 are activated by the transient suppressor controller 130 is determined by three factors: 1) the magnitude of the DC bus voltage as provided by the voltage sensor 60 via the line 64; 2) the derivative of the DC bus voltage as provided by a differentiator circuit 140 via a line 142; and 3) the magnitude of the feedback voltage provided by the voltage emulator via the line 122. The differentiator circuit 140 generates the derivative of the DC bus voltage based upon both the DC bus voltage provided by the line 64 and the load current provided by a line 144.

Figure 3:
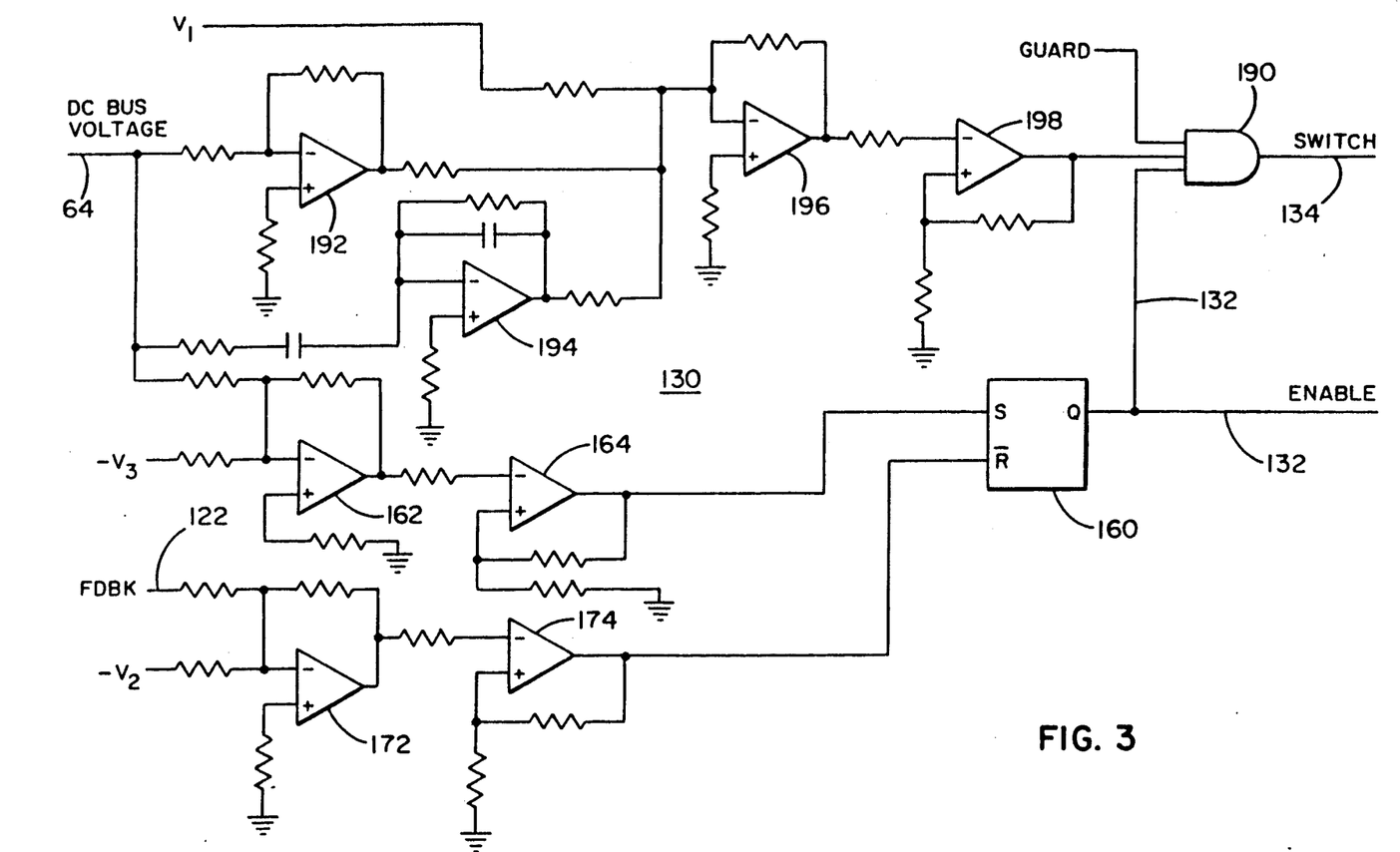
FIG. 3 is a circuit diagram of a transient suppressor controller shown schematically in FIG. 1.
Figure 4:
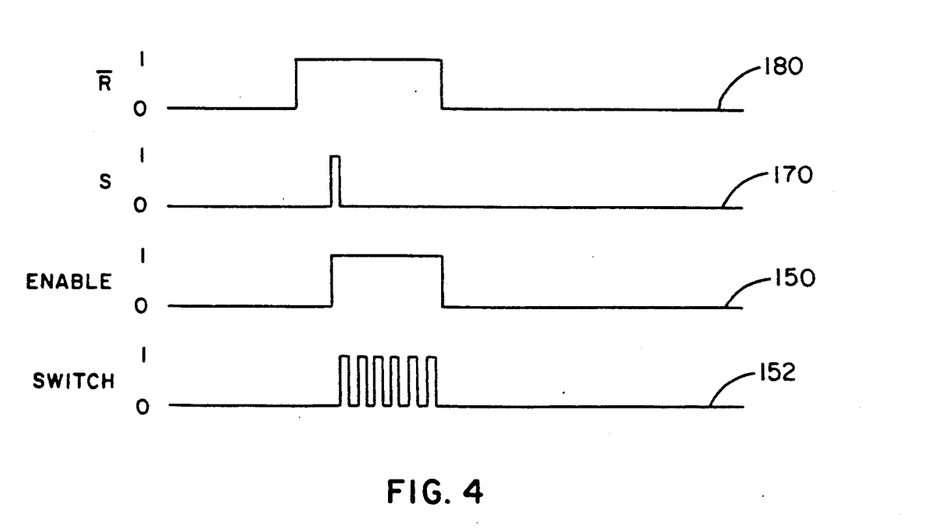
FIG. 4 illustrates several waveforms generated by the transient suppressor controller of FIG. 3.

A circuit diagram of the transient suppressor controller 130 is shown in FIG. 3. The detailed operation of the controller 130 will be described in connection with FIG. 4, which illustrates four waveforms generated by the controller circuit of FIG. 3. FIG. 4 is related to FIG. 2 in that the waveforms shown in FIG. 4 are based on the actual and emulated DC bus voltages shown in FIG. 2.

Now referring to FIG. 4, the enable signal generated by the controller 130 via the line 132 as described above is shown as a waveform 150. The waveform 150 has a logic "1" value for a time period corresponding to the suppression period as defined above and shown in FIG. 2. The switching signal generated by the controller 130 on the line 134 is shown as a waveform 152. The waveform 152 switches at a relatively fast rate during the suppression period.

Referring to FIG. 3, the controller circuit generates the enable waveform 150 via a set-reset (R-S) latch 160 having an S input that determines when its output Q goes high, or logic "1," and a complemented R input, which is active-low, that determines when the Q output goes low, or logic "0."

The signal provided to the S input goes high when the the DC bus voltage increases to the predetermined reference voltage $V_3$, which is shown in FIG. 2. This signal is generated by an operational amplifier 162 operating as a summer that adds the DC bus voltage to $-V_3$. The amplifier 162 is coupled to a second operational amplifier 164 operating as a comparator. When the magnitude of the DC bus voltage increases to the reference voltage $V_3$, the amplifier 164 generates a relatively high voltage, thus causing the output of the R-S latch 160 to become logic "1" and initiating the suppression time period.

Since the DC bus voltage is quickly reduced by the action of the switch 80, a relatively high voltage is only provided to the S input of the latch 160 for a relatively short period of time. However, this is sufficient to cause the Q output to become logic "1." A waveform 170 shown in FIG. 4 illustrates the voltage provided to the S input of the latch 160 in relation to the magnitude of the DC bus voltage and the reference voltage $V_3$ as shown in FIG. 2.

The suppression time period ends when the complemented R input of the latch 160 changes from a relatively high voltage to a low voltage, which occurs when the emulated DC bus voltage becomes less than a predetermined reference voltage $V_2$, which is shown in FIG. 2.

Referring to FIG. 3, an operational amplifier 172 operating as a summer determines the sum of the feedback voltage provided on the line 122 and $-V_2$. As described above, during the suppression period, the regulator feedback voltage is the emulated DC bus voltage, whereas outside the suppression period the feedback voltage is the actual DC bus voltage.

The amplified sum output by the amplifier 172 is provided to an amplifier 174 operating as a comparator. When the feedback voltage is less than the magnitude of the reference voltage $V_2$, the amplifier 174 provides a relatively low voltage to the complemented R input. When the feedback voltage is larger than the voltage $V_2$, a relatively high voltage is supplied to the complemented R input A waveform 180 shown in FIG. 4 illustrates the voltage provided to the complemented R input of the latch 160 in relation to the voltages shown in FIG. 2.

The switching signal used to rapidly switch the transistor 80 and shown in FIG. 4 as waveform 152 is generated by an AND gate 190 in the transient suppressor controller 130 shown in FIG. 3. The AND gate 190 has three inputs One of the inputs is the enable signal generated by the latch 160. The enable signal prevents the switching signal from becoming activated anytime outside the suppression period.

A second input to the AND gate 190, which is optional, is a guard signal The purpose of the guard signal is to prevent the transistor 80 from being activated for more than a predetermined period of time to prevent it from becoming damaged by excessive power. Thus, the guard signal is logic "1" most of the time, except for when the duty cycle of the transistor 80 exceeds a predetermined magnitude.

The third input to the AND gate 190, which is generated by a comparison circuit that determines when the DC bus voltage becomes larger than desired, switches between a high voltage and a low voltage at a relatively fast rate to provide the fast switching action of the transistor 80. This comparison circuit includes an operational amplifier 192 operating to scale the DC bus voltage provided via the line 64 and a second operational amplifier 194 operating as a differentiating amplifier to generate the derivative of the DC bus voltage provided on the line 64.

The outputs of the amplifiers 192, 194 are combined and provided to a third operational amplifier 196, which operates as a summer to sum the combined output of the amplifiers 192, 194, which is negative in sign, with a predetermined reference voltage $V_1$, which is shown in FIG. 2. The summed output of the amplifier 196 is provided to another operational amplifier 198, which operates as a comparator. When the combined output of the amplifiers 192, 194 is larger than the reference voltage $V_1$, the amplifier 198 provides a relatively high voltage to the AND gate 190, and when the combined output is less than the reference voltage $V_1$, a low voltage is provided to the AND gate 190. Referring to FIG. 2, repeated switching of the transistor 80 as controlled by the output of the AND gate 190 limits the DC bus voltage to an oscillatory value roughly approximating $V_1$.

The purpose of the amplifier 194, which generates the derivative of the DC bus voltage, is to cause the comparator 198 to switch before the DC bus voltage reaches the predetermined voltage $V_1$, thus "anticipating" when the DC bus voltage will reach $V_1$. In particular, the voltage generated by the differentiator 194 essentially increases the magnitude of the DC bus voltage supplied to the summer 196 when the latter voltage is increasing and decreases the DC bus voltage supplied to the summer 196 when it is decreasing. As a result, when the DC bus voltage is increasing, the comparator 198 switches somewhat earlier than it otherwise would, thus providing stricter control of the DC bus voltage.

Figures 5, 5A, 6:
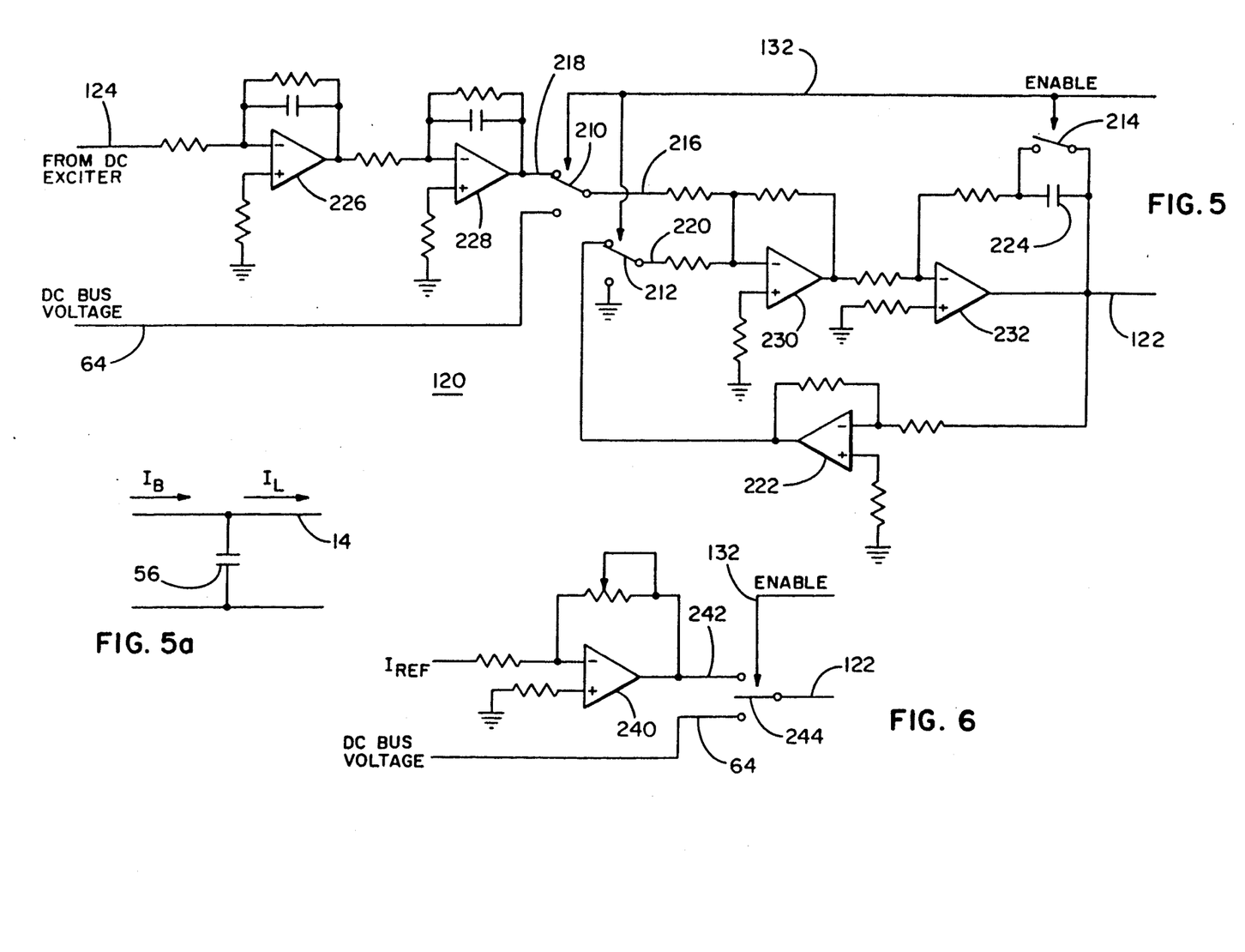
FIG. 5 is a circuit diagram of an embodiment of a voltage emulator shown schematically in FIG. 1.
FIG. 5a illustrates the DC bus current and the load current generated in the preferred embodiments.
FIG. 6 is a circuit diagram of a circuit that may be used in place of the voltage emulator shown schematically in FIG. 1.

A circuit diagram of the voltage emulator 120 is shown in FIG. 5. As described above, the voltage emulator 120 supplies to the voltage regulator 62 via the feedback line 122 an emulation of the DC bus voltage during the suppression time period and the actual DC bus voltage at times other than the suppression time period.

The emulation of the DC bus voltage takes into account the dynamics of the exciter portion 22, the synchronous generator portion 24, and the capacitor 56. The emulation of these components may be accomplished in a conventional manner by generating the actual frequency response for the components. Such a frequency response would provide the magnitude of the DC bus voltage over the desired range of frequencies. After the actual frequency response is generated, the emulation circuit is designed by appropriately selecting the cutoff frequencies and gain of a number of amplifiers so as to duplicate the actual system frequency response. This emulated voltage may be designed so as to generally approximate the DC bus voltage dynamics or it may be designed to be substantially identical to the actual DC bus voltage. Although a specific voltage emulator circuit 120 is shown in FIG. 5, other emulator circuits could be provided instead.

Now referring to FIG. 5, the voltage emulator 120 includes three two-position switches 210, 212, 214 that are controlled by the transient suppressor controller enable signal provided on the line 132. The switch 210 connects a line 216 to a line 218 during the suppression mode of operation and it connects the line 216 to the line 64 during other times. The switch 212 connects a line 220 to the output of an operational amplifier 222 during the suppression mode and it connects the line 220 to ground during other times. The switch 214 is provided across a capacitor 224 and is open during the suppression mode and closed at other times to provide a short circuit across the capacitor 224. The positions of the switches 210, 212, 214 as shown in FIG. 5 correspond to their positions during the suppression mode.

The emulator 120 also includes an operational amplifier 226 and an operational amplifier 228 that emulate the dynamics of the exciter portion 22 and the synchronous generator portion 24, respectively, on the DC bus voltage. The emulation of the dynamics of the capacitor 56 on the DC bus voltage is performed by the amplifier 222 with two other operational amplifiers 230, 232.

During operation, at all times other than during the suppression mode, the voltage emulator 120 provides the DC bus voltage on the line 64 to the feedback line 122 substantially unchanged. This is accomplished by changing the positions of the switches 210, 212, 214 opposite that shown in FIG. 5, and selecting the gain of the amplifiers 230, 232 to provide unity gain of the DC bus voltage provided via the line 64. It should be noted tat the amplifier 222 is effectively taken out of the circuit at times other than the suppression mode since its output is left floating during that time.

During the suppression mode, when the switch positions are as shown in FIG. 5, the emulation of the DC bus voltage is determined by emulating the DC bus current and integrating the difference between the DC bus current and the load current. Referring to FIG. 5a, the load current is illustrated by an arrow $I_L$ and the DC bus current is represented by an arrow $I_B$. It should be appreciated that the DC bus voltage, which is the voltage across the capacitor 56, is equal to the integral of the difference between the currents $I_B$, $I_L$. For example, if $I_B$ is greater than $I_L$ for an appreciable period of time, then the voltage across the capacitor 56 will be greater.

Referring back to FIG. 5, an emulation of the DC bus current is generated by the amplifiers 226, 228 and provided via the line 216 by the switch 210. The output of the amplifier 222, which represents the magnitude of the load current, is provided to the line 220 by the switch 212. The amplifier 230 generates an output representing the difference between the DC bus current and the load current as provided on the lines 216, 220, respectively. This difference is provided to the amplifier 232, which operates as an integrator, where the difference is integrated and output via the line 122 as the emulated DC bus voltage. This output would correspond to the dotted line 112 between points 104 and 108 as illustrated in FIG. 2.

A portion of an alternative embodiment of the invention is shown in FIG. 6. Instead of providing an emulation of the DC bus voltage, the circuit of FIG. 6 supplies a predetermined reference voltage to the voltage regulator 62 instead. The predetermined reference voltage is supplied to an operational amplifier 240 where it is amplified and output via a line 242. During operation, when the system is not in the suppression mode, the circuit supplies the DC bus voltage to the voltage regulator feedback line 122 by connecting a switch 244 between the lines 64 and 122. During the suppression mode, the position of the switch 242 is changed to connect the line 242 to the line 122, thus supplying a predetermined voltage to the voltage regulator 62.

When the alternative embodiment of FIG. 6 is used, the transient suppressor controller 130 shown in FIG. 3 should be slightly modified. In particular, the feedback voltage provided to the operational amplifier 172 should be obtained from the output of the operational amplifier 228 on the line 218 (FIG. 5) instead of the voltage generated on the line 122. In this case, the reference $-V_2$ may represent the generator current reference.

Figure 8:
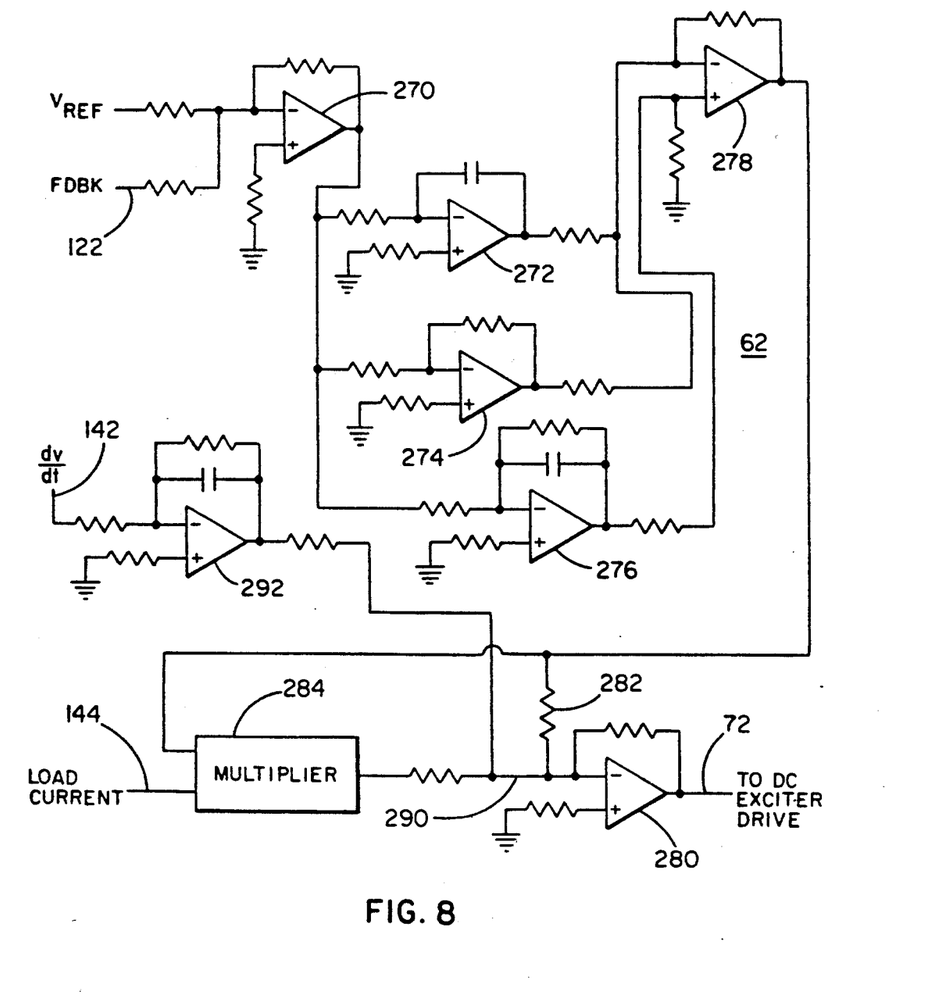
FIG. 8 is a circuit diagram of a voltage regulator shown schematically in FIG. 1.

Since the suppression mode is only triggered when the DC bus voltage is larger than normal, and needs to be reduced by the voltage regulator 62, the predetermined reference voltage generated by the amplifier 240 may be any voltage that is greater than the predetermined reference voltage $V_{REF}$, illustrated in FIG. 8, that represents the desired DC bus voltage magnitude. However, since the generation of a higher predetermined voltage by the amplifier 240 will cause the regulator 62 to correct the DC bus voltage more quickly, the predetermined reference voltage generated by the amplifier 240 may be selected to be approximately equal to or greater than the predetermined voltage V₃ shown in FIG. 2.

Figure 7:
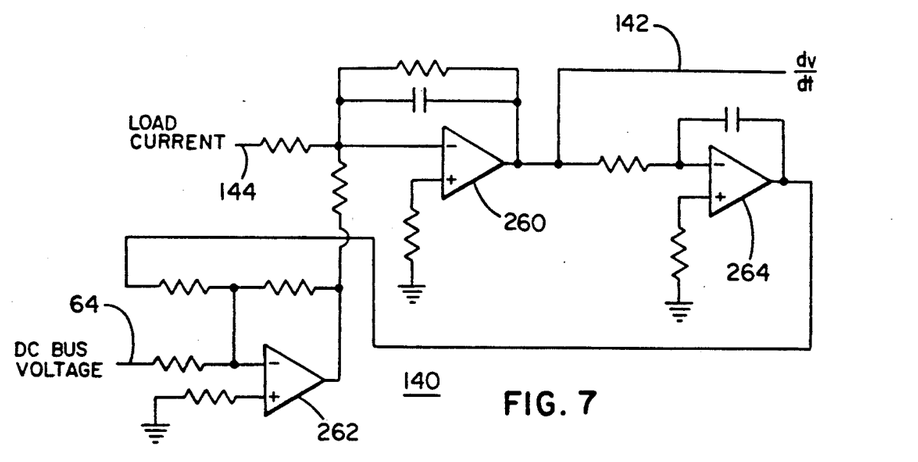
FIG. 7 is a circuit diagram of a voltage differentiator shown schematically in FIG. 1.

A circuit diagram of the differentiator circuit 140 is shown in FIG. 7. The differentiator circuit 140 generates a signal on the line 142 that represents the derivative of the DC bus voltage based upon both the DC bus voltage on the line 64 and the load current provided via the line 144. Although a specific circuit for the differentiator 140 is shown, any appropriate differentiator circuit could be used.

The differentiator 140 does not determine the derivative of the DC bus voltage by direct differentiation of the DC bus voltage. Instead, the determination is based on the net current flowing through the capacitor 56, since the rate of change of voltage across a capacitor is directly proportional to the current through the capacitor.

Referring to FIG. 7, the differentiator circuit 140 comprises an operational amplifier 260. The amplifier 260 determines the net current through the capacitor 56 by effectively determining the difference between the load current provided on the line 144 and the DC bus current as determined by an amplifier 262. The load current and the bus current are illustrated by the arrows $I_L$ and $I_B$, respectively, shown in FIG. 5a. This current difference is amplified by the appropriate scaling factor, which relates to the value of the capacitance of the capacitor 56, and the resultant derivative voltage is output via the line 142.

An operational amplifier 264 operating as an integrator is used to integrate the voltage derivative generated on the line 142. The resultant voltage, which is different than the measured DC bus voltage supplied on the line 64, is supplied to the amplifier 262, which generates an output relating to the magnitude of the DC bus current.

A circuit diagram of the voltage regulator 62 is shown in FIG. 8. The voltage regulator 62 generates a control signal that is transmitted to the DC exciter drive 70 to control the magnitude of the current in the field winding 40. The control signal is generated by the voltage regulator 62 based upon three factors: 1) the difference between voltage fed back to the regulator 62 via the line 122 and a reference voltage $V_{REF}$; 2) the magnitude of the derivative of the DC voltage provided via the line 142; and 3) the magnitude of the load current as provided on the line 144. Although a specific circuit for the voltage regulator 62 is shown, any appropriate voltage regulator circuit could be used.

Now referring to FIG. 8, the difference between the feedback signal on the line 122 and the reference voltage $V_{REF}$ is determined by an operational amplifier 270. The output of the amplifier 270 is provided to a selective gain stage to utilize proportional plus integral (PI) control with lead-lag compensation using partial fraction expansion. The gain stage comprises four operational amplifiers 272, 274, 276, 278.

A first portion of the output of the amplifier 278 is provided to the inverting input of an operational amplifier 280 via a resistor 282. A second portion of the amplifier 278 output is provided to a multiplier 284, which multiplies that portion with the magnitude of the load current provided via the line 144. The result is provided to the inverting input of the amplifier 280 via a line 290.

The line 290 is also supplied with the output of an operational amplifier 292 which contributes at the inverting input of the amplifier 280 a voltage related to the magnitude of the derivative of the DC bus voltage provided on the line 142. The amplifier 280 amplifies the sum of the voltages provided on its inverting input to generate the control signal generated on the line 72 that determines the magnitude of the current in the field winding 40.

Although the preferred embodiments of the invention described above are implemented primarily in hardware, many of the functions could be implemented in software.

Many modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

I claim:

1. An apparatus for generating DC power and suppressing overvoltage transients in said DC power, comprising:
   means for generating DC power having a Dc voltage;
   means coupled to said generating means for sensing the magnitude of said Dc voltage;
   means for determining when the magnitude of said DC voltage increases to a first predetermined magnitude;
   means coupled to said determining means for limiting said DC voltage to said first predetermined magnitude; and
   means coupled to said sensing means for controlling the magnitude of said DC voltage including means for comparing the magnitude of said DC voltage with reference voltage during a first period of time and for comparing the magnitude of a control voltage with said reference voltage during a second period of time.

2. An apparatus as defined in claim 1 wherein said control voltage is variable.

3. An apparatus as defined in claim 1 wherein said second period of time begins when said DC voltage increases to said first predetermined magnitude and ends when said control voltage falls below a second predetermined magnitude.

4. An apparatus as defined in claim 1 wherein said control voltage is an emulation of said DC voltage when said DC voltage is not limited by said limiting means.

5. An apparatus as defined in claim 1 wherein said means for limiting said DC voltage comprises a switch.

6. An apparatus as defined in claim 1 wherein said switch is repeatedly activated and deactivated at a relatively high rate.

7. An apparatus as defined in claim 1 wherein said means for controlling the magnitude of said DC voltage controls the magnitude of said DC voltage based upon said DC voltage during a first period of time and based upon a control voltage during a second period of time, said second period of time beginning when said DC voltage increases to said first predetermined magnitude and ending when said control voltage falls below a second predetermined magnitude.

8. An apparatus for generating electrical power and suppressing overvoltage transients in said electrical power, comprising:

means for generating electrical power wherein the power includes a component with a variable magnitude;

means coupled to said generating means for sensing the magnitude of said component of said electrical power;

means for determining when the magnitude of said component of said electrical power is of a first predetermined magnitude;

means for limiting the magnitude of said component of said electrical power to said first predetermined magnitude; and means for controlling the magnitude of said component of said electrical power based upon said component during a first period of time and based upon a control signal during a second period of time.

9. An apparatus as defined in claim 8 wherein said second period of time begins when said component of said electrical power increases to said first predetermined magnitude and ends when said control signal falls below a second predetermined magnitude.

10. An apparatus as defined in claim 8 wherein said electrical power is DC power.

11. An apparatus as defined in claim 8 wherein said component of said electrical power is voltage and wherein said control signal comprises a control voltage.

12. A power generation system for generating DC power and suppressing overvoltage transients in said DC power, said power generation system comprising:
a prime mover;
a synchronous generator coupled to said prime mover, the rotation of said prime mover causing said generator to generate AC power;
a rectifier coupled to said synchronous generator that generates DC power from said AC power, said DC power having a DC voltage;
a voltage sensor that senses the magnitude of said DC voltage;
a switch coupled across said rectifier;
a voltage regulator that controls the magnitude of said DC voltage based upon said DC voltage when said switch is not activated and based upon a control voltage other than said DC voltage when said switch is activated.

13. A power generation system as defined in claim 12 wherein said switch comprises a transistor in series with a resistor.

14. A power generation system for generating DC power and suppressing overvoltage transients in said DC power, said power generation system comprising:
a prime mover;
a synchronous generator coupled to said prime mover, the rotation of said prime mover causing said generator to generate AC power;
a rectifier coupled to said synchronous generator that generates DC power from said AC power, said DC power having a component of variable magnitude;
a sensor that senses the magnitude of said component of said DC power;
voltage limiting means coupled across said rectifier;
a regulator that controls the magnitude of said component of said DC power based upon said component when said voltage limiting means is not activated and based upon a control signal when said voltage limiting means is activated.

15. A power generation system as defined in claim 14 wherein said regulator controls the magnitude of said component of said DC power based upon said component during a first period of time and based upon said control signal during a second period of time,
said second period of time beginning when said component of said DC power reaches a first predetermined magnitude and ending when said control signal falls below a second predetermined magnitude.

16. A power generation system as defined in claim 14 wherein said component of said DC power is DC voltage and said control signal comprises a control voltage.

17. A power generation system as defined in claim 16,
wherein during said first period of time said regulator controls the magnitude of said DC voltage based upon the difference between the magnitude of said DC voltage and a reference voltage; and
wherein during said second period of time said regulator controls the magnitude of said DC voltage based upon the difference between the magnitude of said control voltage and said reference voltage.

18. A power generation system as defined in claim 14 wherein said voltage limiting means comprises a switch that is repeatedly activated and deactivated at a relatively high rate to limit said DC voltage to a magnitude less than said predetermined magnitude.

19. A power generation system as defined in claim 14 wherein said regulator controls the magnitude of said component of said DC power based upon said component when said voltage limiting means is not activated and based upon an emulation of said component of said DC power when said voltage limiting means is activated.

20. A power generation system as defined in claim 19 wherein said emulation of said component of said DC power comprises a third-order emulation of said component.

21. A power generation system as defined in claim 19 wherein said emulation of said component of said DC power emulates the effect of said synchronous generator on said component.

22. A power generation system as defined in claim 19 wherein said component of said DC power comprises DC voltage.

23. A power generation system for an aircraft for generating DC power and suppressing overvoltage transients in said DC power, said aircraft power generation system comprising:
a prime mover;
a synchronous generator coupled to said prime mover, the rotation of said prime mover causing said generator to generate AC power;
a rectifier coupled to said synchronous generator that converts said AC power into DC power having a DC voltage;
a voltage sensor coupled to said rectifier that senses the magnitude of said DC voltage;
a switch coupled across said rectifier, said switch being repeatedly activated and deactivated at a relatively high rate to limit said DC voltage to a magnitude less than a first predetermined voltage;
a voltage regulator that controls the magnitude of said DC voltage based upon said DC voltage during a first period of time when said switch is not activated and based upon a variable control voltage during a second period of time when said switch is activated,
said second period of time beginning when said first DC voltage increases to said predetermined magnitude and ending when said control voltage falls below a second predetermined magnitude, and said control voltage comprising an emulation of said DC voltage, said control voltage emulating the effect of said synchronous generator on said DC voltage.

24. A method of generating DC power in a power generation system for an aircraft and suppressing overvoltage transients in said DC power, said method comprising the steps of:
   (a) inducing rotation of a prime mover coupled to a synchronous generator to generate AC power;
   (b) rectifying said AC power generated in said step (a) to generate DC power;
   (c) sensing the magnitude of a component of said DC power;
   (d) determining when said component of said DC power reaches a predetermined magnitude;
   (e) generating a control signal when said component of said DC power reaches said predetermined magnitude in said step (d); and
   (f) controlling the magnitude of said component of said DC power based upon a feedback signal, said feedback signal being derived from one of the magnitude of said component of said DC power as sensed in said step (c) and said control signal generated during said step (e).

25. A method as defined in claim 24 wherein said component of said DC power is voltage.

26. A method as defined in claim 24 wherein said control signal comprises an emulation of said component of said DC power.

27. A method as defined in claim 26 wherein said emulation comprises a third-order emulation of said component of said DC power.

28. A method as defined in claim 26 wherein said emulation is an emulation of the synchronous generator.

29. A method as defined in claim 24 additionally comprising the step (g) of limiting the magnitude of said component of said DC power to said predetermined magnitude.

30. A method as defined in claim 29 wherein said step (g) comprises repeatedly activating and deactivating a switch at a relatively high rate.

31. A method of generating DC power in a power generation system and suppressing overvoltage transients in said DC power, said method comprising the steps of:
   (a) inducing rotation of a prime mover coupled to a synchronous generator to generate AC power;
   (b) rectifying said AC power generated in said step (a) to generate DC power at a DC voltage;
   (c) sensing the magnitude of the DC voltage of said DC power;
   (d) determining when said DC voltage reaches a first predetermined magnitude;
   (e) reducing said DC voltage upon said DC voltage reaching said first predetermined magnitude as determined in said step (d);
   (f) generating a control voltage when said DC voltage reaches said first predetermined magnitude; and
   (g) regulating the magnitude of said DC voltage to a second predetermined magnitude based upon the magnitude of said DC voltage as sensed in said step (c) until the DC voltage reaches said first predetermined magnitude and based upon said control voltage generated during said step (f) after said DC voltage reaches said first predetermined magnitude, said control voltage having a magnitude larger than said second predetermined magnitude.

* * * * *